(12) United States Patent
Kim

(10) Patent No.: US 8,017,008 B2
(45) Date of Patent: Sep. 13, 2011

(54) WATER PURIFICATION FILTER ASSEMBLY

(75) Inventor: Min-won Kim, Chungcheongbuk-do (KR)

(73) Assignee: Whi-Dong Joung, Seoul (KR)

( * ) Notice: Subject to any disclaimer, the term of this patent is extended or adjusted under 35 U.S.C. 154(b) by 424 days.

(21) Appl. No.: 12/307,778

(22) PCT Filed: Aug. 29, 2006

(86) PCT No.: PCT/KR2006/003395
§ 371 (c)(1),
(2), (4) Date: Feb. 10, 2009

(87) PCT Pub. No.: WO2008/007823
PCT Pub. Date: Jan. 17, 2008

(65) Prior Publication Data
US 2009/0289000 A1    Nov. 26, 2009

(30) Foreign Application Priority Data

Jul. 10, 2006 (KR) .................. 10-2006-0064236

(51) Int. Cl.
*B01D 27/08* (2006.01)
*B01D 35/30* (2006.01)

(52) U.S. Cl. ......... 210/232; 210/235; 210/440; 210/444

(58) Field of Classification Search .................. 210/232, 210/234, 235, 435, 440, 441, 443, 444, 454
See application file for complete search history.

(56) References Cited

U.S. PATENT DOCUMENTS

| 4,915,831 | A  | * | 4/1990  | Taylor        | 210/440 |
| 6,120,685 | A  | * | 9/2000  | Carlson et al.| 210/444 |
| 6,458,269 | B1 | * | 10/2002 | Bassett et al.| 210/235 |
| 6,632,355 | B2 | * | 10/2003 | Fritze         | 210/443 |
| 6,800,199 | B1 | * | 10/2004 | Rhee           | 210/232 |
| 6,966,986 | B1 | * | 11/2005 | Lackey         | 210/234 |
| 7,186,338 | B2 | * | 3/2007  | Boisvert       | 210/232 |
| 7,435,345 | B2 | * | 10/2008 | Takeuchi et al.| 210/232 |

* cited by examiner

*Primary Examiner* — Christopher Upton
(74) *Attorney, Agent, or Firm* — Egbert Law Offices PLLC

(57) ABSTRACT

Disclosed herein is a filter assembly for water purifiers. The filter assembly includes a head having an inlet duct, a control valve, and an outlet duct. A circular cap is provided on the lower portion of the head, and has cylindrical space. A filter cap is mounted to the circular cap. A filter cartridge has a filtering part which is provided with a filter to purify water. A plurality of fastening holes is formed in the outer circumference of the circular cap, and has a step. Locking parts are disposed in the fastening holes to lock the filter cartridge. An elastic member surrounds the circular cap and the outer surfaces of the supports parts, thus elastically supporting the locking parts to the fastening holes. The filter cap has on the outer circumference of the upper portion thereof a plurality of fastening holes into which the locking parts are fitted.

6 Claims, 5 Drawing Sheets

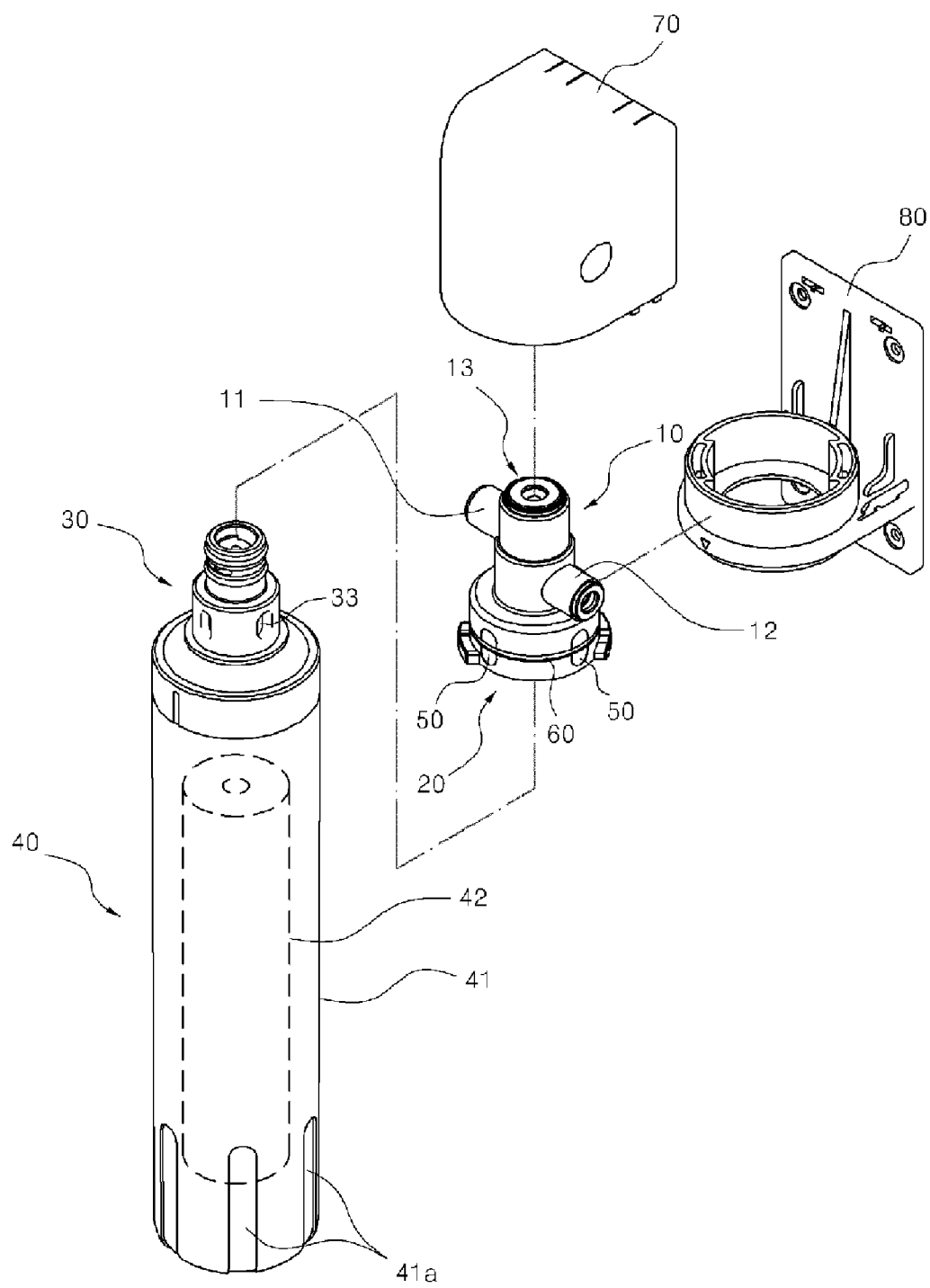
[Fig. 1]

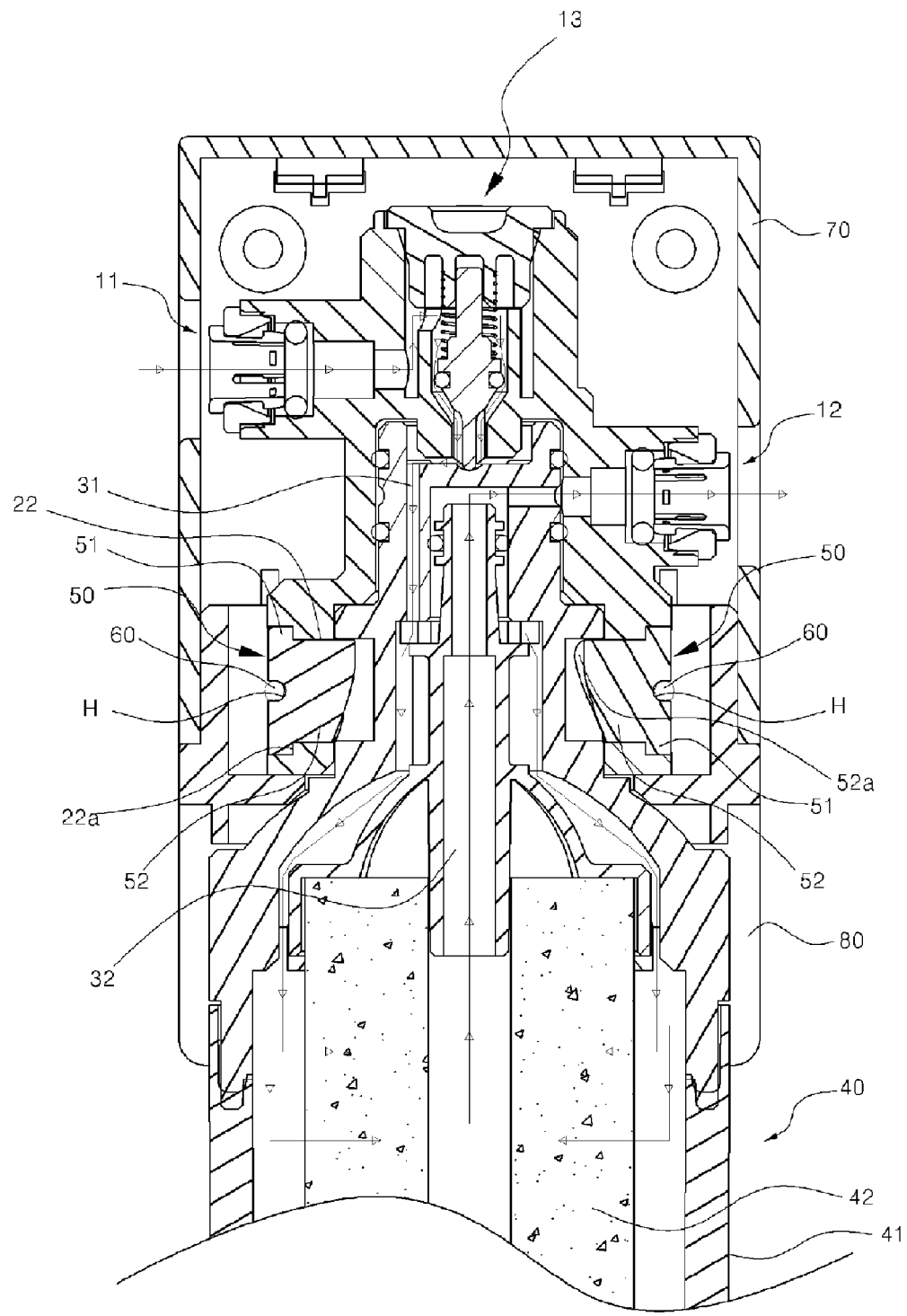
[Fig. 2]

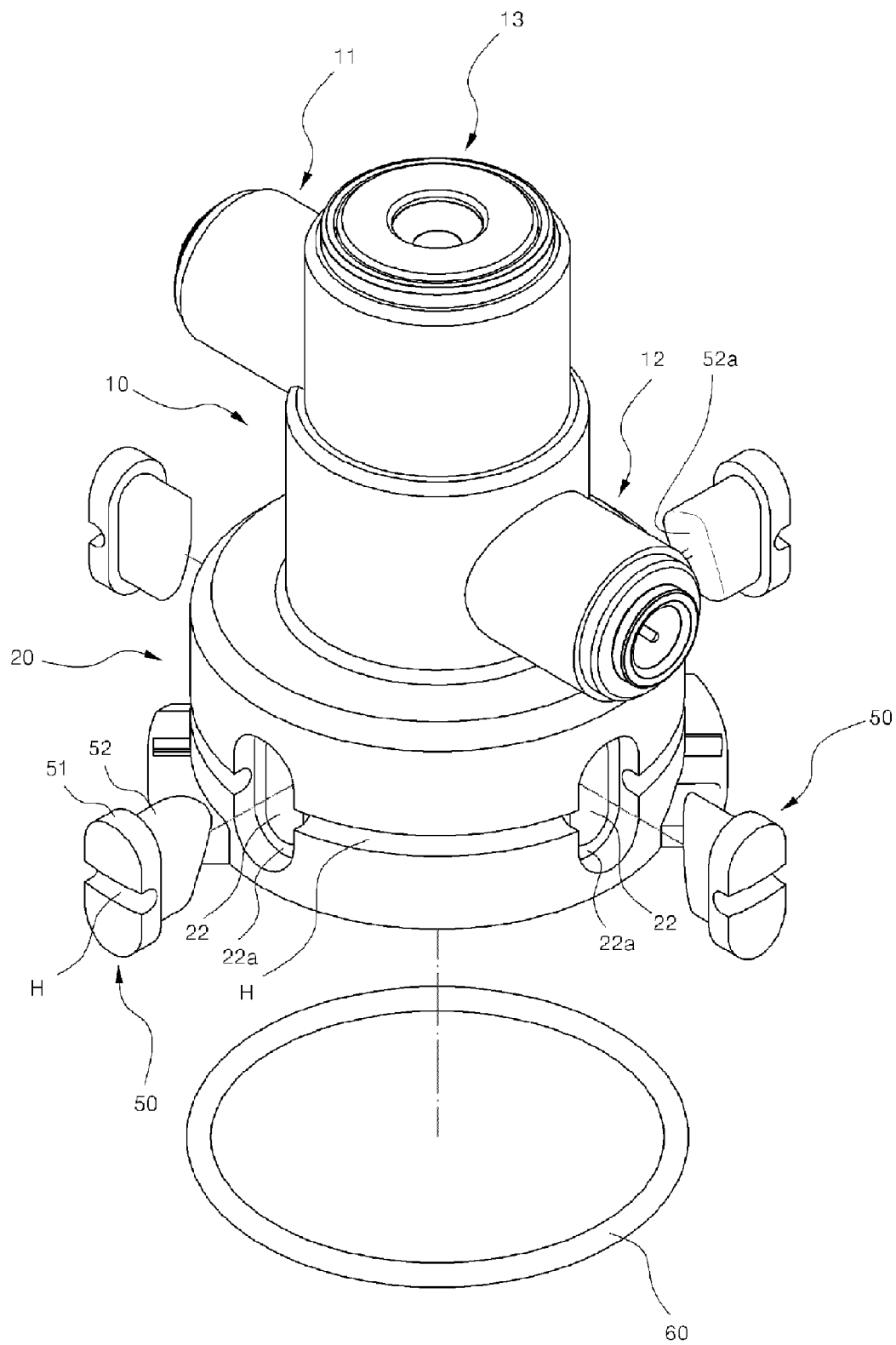
[Fig. 3]

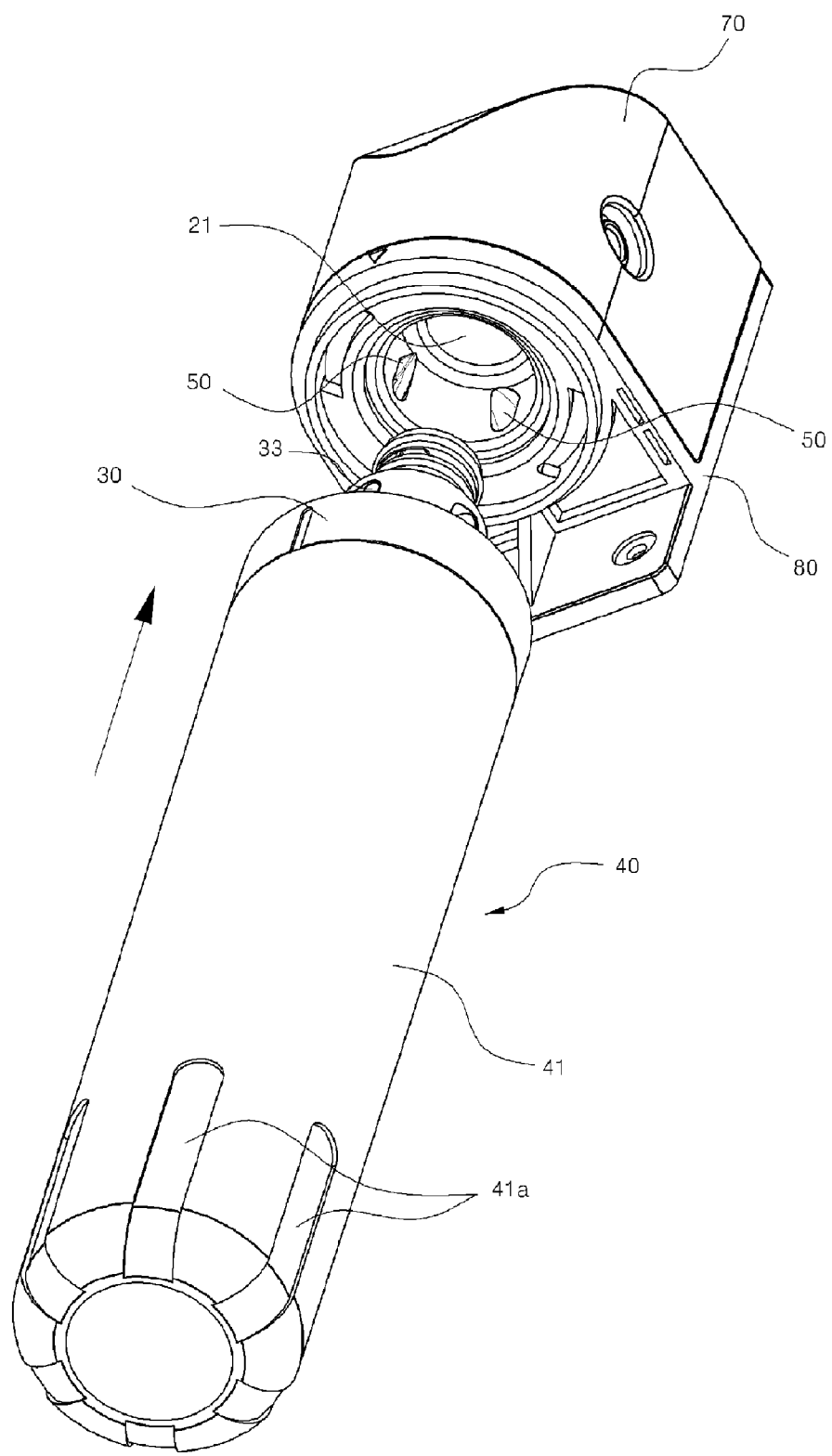
[Fig. 4]

[Fig. 5]
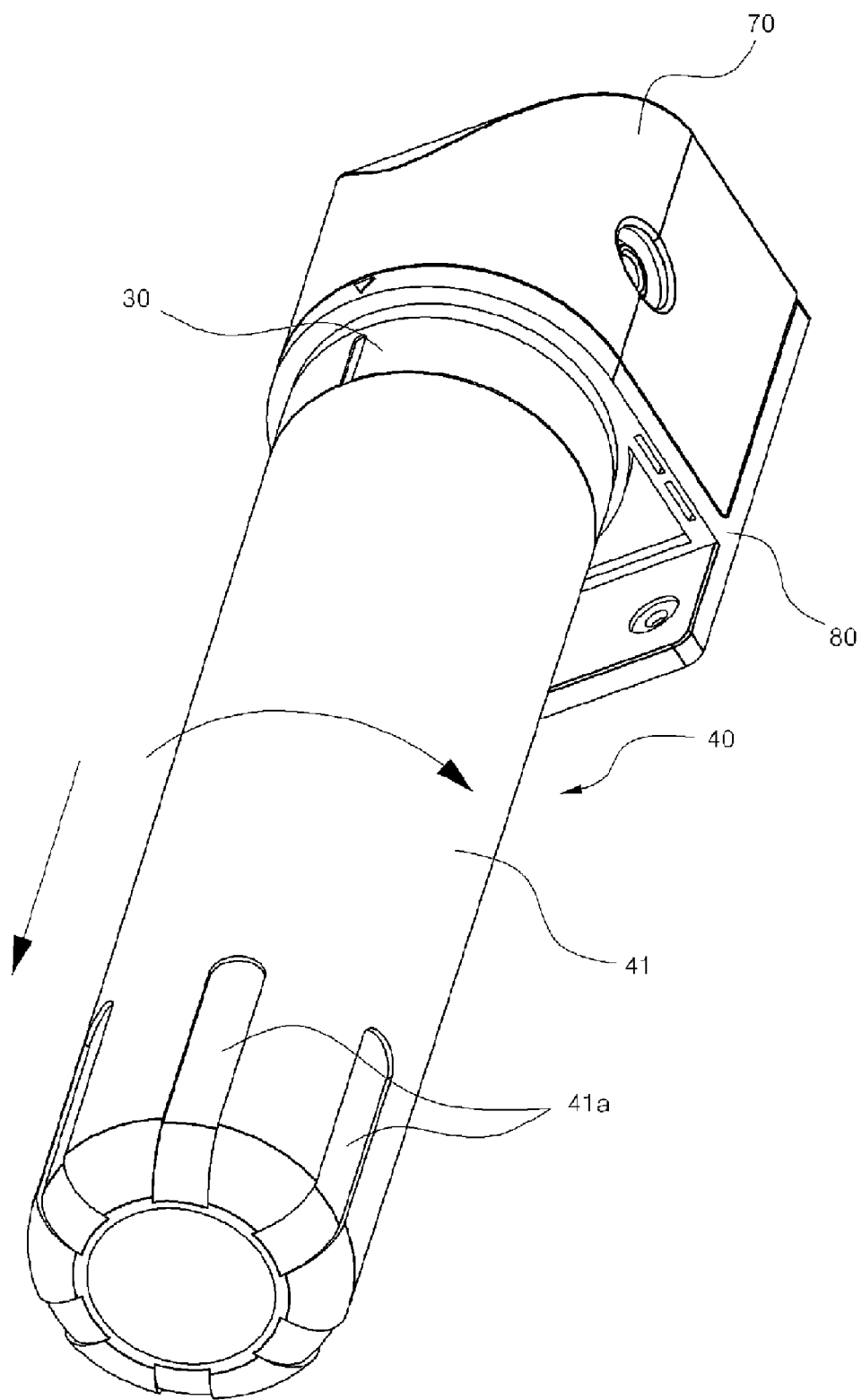

WATER PURIFICATION FILTER ASSEMBLY

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a filter assembly for water purifiers, which is capable of reducing the time required to replace a filter cartridge with a new one, in addition to allowing even an inexperienced person to easily replace a filter cartridge with a new one.

2. Description of Related Art Including Information Disclosed Under 37 CFR 1.97 and 37 CFR 1.98

Generally, a water purifier is an apparatus for removing impurities from water, such as tap water or spring water, prior to supplying the water. A filter cartridge is provided in the water purifier to purify the water in multiple stages.

Furthermore, the filter cartridge of the water purifier is provided with an inlet port and an outlet port. According to the intended purpose, a pre-filter, a pre-carbon filter, a membrane filter, a post-carbon filter, etc. are selectively used in the filter cartridge.

In this case, the filter cartridge of the water purifier has a water inlet duct into which water flows, and a water outlet duct from which water is discharged. A manifold having a control valve is mounted to the water inlet duct to control the flow of water.

In a detailed description, a circular cap is provided on the lower portion of a head, and has circular space connected to the water inlet duct and the water outlet duct, with a slide passage provided on the inner circumference of the circular cap. A support plate, protruding from the outer circumference of the upper portion of the filter cartridge, is fitted into the slide passage of the circular cap, so that the filter cartridge is mounted to the circular space of the circular cap.

BACKGROUND ART

The filter cartridge is coupled to the head, thus forming a filter assembly. The conventional filter assembly is described in detail in Korean Patent No. 521117, which was filed by the applicant of the present invention, and was registered.

The conventional filter assembly has a problem that occurs when the support plate of the filter cartridge slides and reaches the slide passage of the circular cap.

That is, in order to correctly align the support plate of the filter cartridge with the slide passage of the circular cap, a user must adjust the position of the filter cartridge while rotating the filter cartridge under the circular cap in several directions. Thus, the conventional filter assembly is problematic in that the time required to replace the filter cartridge is undesirably increased, and an inexperience person has difficulty replacing the filter cartridge with a new one.

BRIEF SUMMARY OF THE INVENTION

Technical Problem

Accordingly, the present invention has been made keeping in mind the above problems occurring in the prior art, and an object of the present invention is to provide a filter assembly for water purifiers, which reduces the time required to replace a filter cartridge with a new one, and enables easy replacement.

Technical Solution

In order to accomplish the object, the present invention provides a filter assembly for water purifiers, having a head including an inlet duct for guiding inflow water, a control valve for controlling a flow of water fed into the inlet duct, and an outlet duct for discharging purified water to an outside; a circular cap provided on a lower portion of the head and having cylindrical space therein; a filter cap fitted into the cylindrical space and having an inlet hole into which water flows and a discharge hole for discharging water; and a filter cartridge having a filtering part which is provided with a filter to purify water. The filter assembly includes a plurality of first fastening holes formed in an outer circumference of the circular cap, each having a step; a locking part disposed in each of the first fastening holes, thus locking the filter cartridge; an elastic member provided to surround the circular cap and the locking part and elastically supporting the locking part to the corresponding first fastening hole; and a plurality of second fastening holes formed in an outer circumference of an upper portion of the filter cap, for fitting the locking part into each of the second fastening holes.

Preferably, the locking part includes a stop part locked to the step, and a body provided on a surface of the stop part, passing through each of the first fastening holes of the circular cap to be fitted into each of the second fastening holes.

Preferably, the body has a curved inclined surface which extends obliquely from a corner of an end thereof, and is fitted into each of the second fastening holes of the filter cap. The body is removed from each of the second fastening holes by rotating the filter cap.

Preferably, the elastic member is selected from a group consisting of a spring and synthetic resin.

Preferably, a support groove is formed on an outer circumference of each of the circular cap and the locking part, so that the elastic member is seated in the support groove.

Preferably, the filtering part has in an outside of a lower surface thereof a plurality of friction holes to facilitate rotation of the filter cartridge.

Advantageous Effects

As described above, a filter assembly for water purifiers according to the present invention is constructed so that locking parts, each having an inclined surface, are provided in fastening holes formed in the lower portion of a circular cap, and the circular cap and the locking parts are surrounded with an elastic member to elastically lock the locking parts to the fastening holes. The inclined surface of each locking part allows the locking part to be easily fitted into a corresponding fastening hole formed in the upper portion of a filter cap, and the filter cap is easily rotated so as to be easily separable from the circular cap. Thereby, the filter assembly for water purifiers can reduce the time required to replace the filter cartridge, in addition to allowing even an inexperience person to easily replace the filter cartridge with a new one.

BRIEF DESCRIPTION OF THE SEVERAL VIEWS OF THE DRAWINGS

FIG. 1 is an exploded perspective view showing a filter assembly for water purifiers, according to an embodiment of the present invention.

FIG. 2 is a sectional view showing the filter assembly for water purifiers, according to an embodiment of the present invention.

FIG. 3 is a perspective view showing a head and a circular cap in the filter assembly for water purifiers, according to an embodiment of the present invention.

FIG. 4 is a perspective view showing the operation of mounting a filter cartridge to the circular cap in the filter assembly for water purifiers, according to an embodiment of the present invention.

FIG. 5 is a perspective view showing the operation of separating the filter cartridge from the circular cap in the filter assembly for water purifiers, according to an embodiment of the present invention.

DESCRIPTION OF REFERENCE CHARACTERS OF IMPORTANT PARTS

10: head
11: inlet duct
12: outlet duct
13: control valve
20: circular cap
21: cylindrical space
22: fastening holes
22a: step
30: filter cap
31: inlet hole
32: discharge hole
33: fastening holes
40: filter cartridge
41: filtering part
41a: friction holes
42: filter
50: locking parts
51: stop part
52: body
52a: inclined surface
60: elastic member
70: cover
80: bracket
H: support grooves

DETAILED DESCRIPTION OF THE INVENTION

Hereinafter, a filter assembly for water purifiers, according to the preferred embodiment of the present invention, will be described with reference to the accompanying drawings. For ease and convenience of description, the thickness of lines and the size of components in the drawings may be exaggerated. Further, the terms used herein are defined in consideration of the function of this invention, and maybe varied according to the user's intention. Therefore, the terms should be defined based on the overall contents of the invention.

While the preferred embodiment of the invention will be described, this description is for illustrative purposes only, and it is to be understood that changes and variations maybe made without departing from the spirit or scope of the following claims.

FIG. 1 is an exploded perspective view showing a filter assembly for water purifiers, according to an embodiment of the present invention. FIG. 2 is a sectional view showing the filter assembly for water purifiers, according to an embodiment of the present invention. FIG. 3 is a perspective view showing a head and a circular cap in the filter assembly for water purifiers, according to an embodiment of the present invention. FIG. 4 is a perspective view showing the operation of mounting a filter cartridge to the circular cap in the filter assembly for water purifiers, according to an embodiment of the present invention. FIG. 5 is a perspective view showing the operation of separating the filter cartridge from the circular cap in the filter assembly for water purifiers, according to an embodiment of the present invention.

As shown in the drawings, a filter assembly for water purifiers, according to an embodiment of the present invention, includes a head 10 which has an inlet duct 11, a control valve 13, and an outlet duct 12, a circular cap 20 which is provided on the lower portion of the head 10, a filter cap 30 which is mounted to the circular cap 20, a filter cartridge 40 which is coupled to the filter cap 30, a plurality of fastening holes 22 which are formed in the outer circumference of the circular cap 20 and each have a step 22a, locking parts 50 which are disposed in the corresponding fastening holes 22 to lock the filter cartridge 40, and an elastic member 60 which is provided to surround the circular cap 20 and the outer surfaces of the supports parts 50, thus elastically supporting the locking parts 50 to the corresponding fastening holes 22. The filter cap 30 has on the outer circumference of the upper portion thereof a plurality of fastening holes 33 into which the locking parts 50 are fitted.

In this case, water is fed into the head 10 to be purified, and the purified water is discharged through the head 10 to the outside. The inlet duct 11 is provided on one side of the head 10, and guides water fed into the head 10. The control valve 13 is installed in the head 10 and is connected to the inlet duct 11, thus controlling the inflow of water. The outlet duct 12 is provided at a predetermined position on the head 10 to discharge water purified by the filter cartridge 40 to the outside. Further, an inlet port and an outlet port may be provided on the inlet duct 11 and the outlet duct 12 to facilitate the inflow and discharge of water.

Further, the circular cap 20 functions to support the filter cap 30 coupled to the filter cartridge 30, and is provided on the lower portion of the head 10. A cylindrical space 21 is defined in the circular cap 20 and is connected to the control valve 13 and the outlet duct 12. The plurality of fastening holes 22 each having the step 22a is formed in the outer circumference of the circular cap 20.

The locking parts 50 are provided in the corresponding fastening holes 22 of the circular cap 20 to lock the filter cap 30. The elastic member 60 is provided to surround the outer circumferences of the circular cap 20 and the outer surfaces of the locking parts 50, and elastically supports the locking parts 50 to the corresponding fastening holes 22.

In this case, each locking part 50 has, on an end thereof, a stop part 51 which is stopped by the step 22a of the corresponding fastening hole 22. A body 52 extends from the surface of the stop part 51. When the body 52 passes through each fastening hole 22 of the circular cap 20 and is fitted into the corresponding fastening hole 33 of the filter cap 30, the filter cap 30 is firmly secured to the cylindrical space 21 of the circular cap 20.

At this time, a curved inclined surface 52a is provided on one side of each body 52, so that the body 52 is fitted into the corresponding fastening hole 33 of the filter cap 30 without interference occurring between the upper end of the filter cap 30 inserted into the circular space 21 and the body 52. Meanwhile, by rotating the filter cap 30, each body 52 is removed from an associated fastening hole 33.

That is, as shown in the drawings, the curved inclined surface 52a is provided on the surface of each body 52 in such a way as to extend obliquely from the left side of the upper end thereof. Thus, the filter cap 30 is fitted into the cylindrical space 21 without interference from a corresponding body 52. Simultaneously, each fastening hole 33 is secured to a corresponding body 52. Further, when one desires to remove the filter cap 30 from the circular cap 20, the filter cap 30 is rotated. At this time, the outer circumference of the upper end of the filter cap 30 rotates along the inclined surface 52a of each locking part 52, thus preventing the body 52 from being locked to the inner surface of each fastening hole 33. Each body 52 is removed from the corresponding fastening hole 33. By downwardly moving the filter cap 30, the filter cap 30 can be easily removed from the circular cap 20.

Further, the left side surface of each body 52 has the shape of an inverted triangle, and each body 52 is arranged to protrude into the circular cap 20. Thus, each body 52 contacts the side edge of the corresponding fastening hole 33, thus preventing the filter cap 30 from rotating in another direction. That is, the filter cap 30 is rotated in one direction and is thus separated from the circular cap 20.

The drawings show one example of the body 52, which has on one side thereof the curved inclined surface 52a. This is only a preferred embodiment, but the invention is not limited to this embodiment. That is, each body 52 may have on one end thereof a protrusion having the shape of a water drop so that the body 52 is fitted into the corresponding fastening hole 33 of the filter cap 30 without interfering with the upper surface of the filter cap 30, and the body 52 is not locked to the fastening hole 33 when the filter cap 30 rotates. Such a body structure allows the filter cap 30 to rotate in opposite directions to thus be removed from the circular cap 20.

Support grooves H are formed on the outer circumference of the circular cap 20 and the outer surfaces of the locking parts 50, so that the elastic member 60 is seated into the support grooves H. Thereby, the elastic member 60 can provide a predetermined elastic force to the locking parts 50 without being removed from the outer circumference of the circular cap 20 or from the outer surfaces of the locking parts 50.

That is, when a user desires to separate the filter cartridge 40 from the circular cap 20, he or she grasps the filter cartridge 40 and rotates the filter cartridge 40 in one direction. At this time, the outer circumference of the filter cap 30 rotates along the inclined surface 52a of each locking part 50, and the filter cap 30 pushes each locking part 50 outwards. Since each locking part 50 is restricted by the elastic member 60, the locking part 50 continues to press the outer circumference of the filter cap 30 without being removed from the corresponding fastening hole 22. In such a state, when the filter cartridge 40 is moved downwards, the filter cap 30 coupled to the filter cartridge 40 is separated from the circular cap 20, and thus it is possible to replace the filter cartridge 40 with a new one.

Since the step 22a is provided on each fastening hole 22, the stop part 41 of each locking part 50 is supported to the step 22a. Thereby, each locking part 50 can be maintained in the corresponding fastening hole 22.

Further, the elastic member 60 is selected from among the group consisting of a spring and synthetic resin, and provides elastic force to the locking parts 50. The elastic member 60 is not limited to the spring or the synthetic resin, but anything having a ring shape is possible as long as it can provide elastic force to the locking parts 50.

The filter cap 30 is fitted into the cylindrical space 21 which is defined in the circular cap 20, and has an inlet hole 31 into which water is fed from the inlet duct 11, and a discharge hole 32 through which water is discharged to the outlet duct 12. Further, the plurality of fastening holes 33 is formed in the outer circumference of the upper portion of the filter cap 30 to correspond to the fastening holes 22 of the circular cap 20, so that the bodies 52 of the locking parts 50, arranged in the fastening holes 22, are fitted into the fastening holes 33. Thereby, the filter cap 30 is firmly secured to the circular cap 20.

Meanwhile, the filter cartridge 40 is mounted to the lower end of the filter cap 30 which is secured to the circular cap 20. Such a filter cartridge 40 is provided with a filtering part 41 that purifies inflow water.

Further, a filter 42 is provided in the filtering part 41 to purify water. A plurality friction holes 41a is formed in the outside of the lower surface of the filtering part 41 and facilitates the rotation of the filter cartridge 40. That is, the friction holes 41a function to prevent the filter cartridge 40 from slipping out of a user's hand when he or she grasps and rotates the filter cartridge 40. The user grasps the friction holes 41a and rotates the filter cartridge 41 without slipping, and thus the fastening holes 33 are removed from the bodies 52. Thereafter, the filter cartridge 40 is moved downwards. In this way, the filter cartridge 40 equipped with the filter cap 30 can be conveniently separated from the circular cap 20.

As shown in FIG. 1, a cover 70 may be mounted to the upper portion of the circular cap 20 to which the filter cartridge 40 is mounted, that is, the upper portion of the head 10. The circular cap 20 coupled to the filter cartridge 40 may be mounted to a bracket 80 which is secured to a wall or the like.

I claim:

1. A filter assembly for water purifiers, said filter assembly comprising:
   a head being comprised of an inlet duct for guiding inflow water, a control valve for controlling a flow of water fed into said inlet duct, and an outlet duct for discharging purified water to an outside;
   a circular cap being provided on a lower portion of said head and having cylindrical space therein;
   a filter cap fitted into the cylindrical space and having an inlet hole into which water flows, and a discharge hole for discharging water;
   a filter cartridge having a filtering part and a filter to purify water;
   a plurality of first fastening holes formed in an outer circumference of said circular cap, each hole having a step;
   a plurality of second fastening holes formed in an outer circumference of an upper portion of the filter cap;
   a locking part disposed in each of the first fastening holes and fitting into each of the second fastening holes, locking the filter cartridge; and
   an elastic member provided to surround the circular cap and the locking part, elastically supporting the locking part to the corresponding first fastening hole.

2. The filter assembly according to claim 1, wherein the locking part comprises:
   a stop part locked to the step; and
   a body being provided on a surface of the stop part, and passing through each of the first fastening holes of the circular cap to be fitted into each of the second fastening holes.

3. The filter assembly according to claim 2, wherein the body has a curved inclined surface extending obliquely from a corner of an end thereof and being fitted into each of the second fastening holes of the filter cap, the body being removed from each of the second fastening holes by rotating the filter cap.

4. The filter assembly according to claim 1, wherein the elastic member is selected from a group consisting of a spring and synthetic resin.

5. The filter assembly according to claim 1, wherein said circular cap and each locking part has an outer circumference with a support groove, the elastic member being seated in the support groove.

6. The filter assembly according to claim 1, wherein said filtering part has in an outside of a lower surface thereof a plurality of friction holes to facilitate rotation of the filter cartridge.

* * * * *